US010513669B2

(12) United States Patent
Xiao et al.

(10) Patent No.: US 10,513,669 B2
(45) Date of Patent: *Dec. 24, 2019

(54) CHEMICAL ADDITIVES TO IMPROVE OIL SEPARATION IN STILLAGE PROCESS OPERATIONS

(71) Applicant: Ecolab USA Inc., St. Paul, MN (US)

(72) Inventors: Lan Xiao, Naperville, IL (US);
Xiaodong Huang, Aurora, IL (US);
Xuejun Wang, Oswego, IL (US);
Philip Eastin, Saint Louis, MO (US);
Jason Van't Hul, Harrisburg, SD (US)

(73) Assignee: Ecolab USA Inc., St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/994,608

(22) Filed: May 31, 2018

(65) Prior Publication Data

US 2018/0273878 A1 Sep. 27, 2018

Related U.S. Application Data

(63) Continuation of application No. 15/212,352, filed on Jul. 18, 2016, now Pat. No. 10,005,982.

(60) Provisional application No. 62/194,195, filed on Jul. 18, 2015, provisional application No. 62/194,196, filed on Jul. 18, 2015.

(51) Int. Cl.
*C11B 3/16* (2006.01)
*C11B 1/00* (2006.01)
*C11B 13/00* (2006.01)

(52) U.S. Cl.
CPC .................. *C11B 3/16* (2013.01); *C11B 1/00* (2013.01); *C11B 13/00* (2013.01); *Y02W 30/74* (2015.05)

(58) Field of Classification Search
CPC ... C11B 3/16; C11B 1/10; C11B 13/00; C01B 33/14; C02F 1/52
See application file for complete search history.

(56) References Cited

U.S. PATENT DOCUMENTS

| 2,731,326 A | 1/1956 | Alexander et al. |
| 2,750,345 A | 6/1956 | Alexander |
| 2,913,419 A | 11/1959 | Alexander |
| 4,217,240 A | 8/1980 | Bergna |
| 4,343,717 A | 8/1982 | Lok et al. |

(Continued)

FOREIGN PATENT DOCUMENTS

| EP | 0464289 A2 | 1/1992 |
| GB | 1587236 A | 4/1981 |

(Continued)

OTHER PUBLICATIONS

European Patent Office, International Search Report in International Patent Application No. PCT/US2016/042714, dated Sep. 20, 2016, 3 pp.

(Continued)

*Primary Examiner* — Yate' K Cutliff
(74) *Attorney, Agent, or Firm* — Leydig, Voit & Mayer, Ltd.

(57) ABSTRACT

The invention provides methods and compositions for recovering oil from stillage. The method comprises the addition of a surfactant and a microparticle comprising hydrophilic silica to a grain to ethanol stillage. The methods and compositions of the present invention release oil trapped in solid aggregates, increasing the total amount of oil extracted from the stillage.

19 Claims, 8 Drawing Sheets

(56) References Cited

U.S. PATENT DOCUMENTS

| | | |
|---|---|---|
| 4,385,961 A | 5/1983 | Svending et al. |
| 4,388,150 A | 6/1983 | Sunden et al. |
| 4,702,798 A | 10/1987 | Bonanno |
| 4,753,710 A | 6/1988 | Langley et al. |
| 4,927,498 A | 5/1990 | Rushmere |
| 4,988,659 A | 1/1991 | Pecoraro |
| 5,098,520 A | 3/1992 | Begala et al. |
| 5,182,062 A | 1/1993 | Regelsberger et al. |
| 5,196,177 A | 3/1993 | Watanabe et al. |
| 5,221,648 A | 6/1993 | Wachter |
| 5,283,322 A | 2/1994 | Martin et al. |
| 5,368,833 A | 11/1994 | Johansson et al. |
| 5,558,781 A | 9/1996 | Buchold et al. |
| 5,573,674 A | 11/1996 | Lind et al. |
| 5,605,970 A | 2/1997 | Selvarajan |
| 5,643,414 A | 7/1997 | Johansson et al. |
| 5,662,810 A | 9/1997 | Willgohs |
| 5,688,482 A | 11/1997 | Saastamoinen |
| 5,837,776 A | 11/1998 | Selvarajan et al. |
| 5,840,158 A | 11/1998 | Choo et al. |
| 5,958,233 A | 9/1999 | Willgohs |
| 5,985,992 A | 11/1999 | Chen |
| 6,013,157 A | 1/2000 | Li et al. |
| 6,265,477 B1 | 7/2001 | Hurlock |
| 6,361,652 B2 | 3/2002 | Keiser et al. |
| 6,361,653 B2 | 3/2002 | Keiser et al. |
| 6,372,089 B1 | 4/2002 | Keiser et al. |
| 6,372,805 B1 | 4/2002 | Keiser et al. |
| 6,372,806 B1 | 4/2002 | Keiser et al. |
| 6,486,216 B1 | 11/2002 | Keiser et al. |
| 6,548,102 B2 | 4/2003 | Fenske et al. |
| 6,569,908 B2 | 5/2003 | Noguchi et al. |
| 6,632,489 B1 | 10/2003 | Watanabe et al. |
| 6,872,685 B2 | 3/2005 | Timken |
| 7,309,602 B2 | 12/2007 | David |
| 7,497,955 B2 | 3/2009 | Scheimann et al. |
| 7,566,469 B2 | 7/2009 | Scheimann |
| 7,601,858 B2 | 10/2009 | Cantrell et al. |
| 7,602,858 B2 | 10/2009 | Dally |
| 7,608,729 B2 | 10/2009 | Winsness et al. |
| 8,003,707 B2 | 8/2011 | Holland |
| 8,192,627 B2 | 6/2012 | Gallop et al. |
| 8,470,981 B2 | 6/2013 | Scheimann et al. |
| 8,722,911 B2 | 5/2014 | Bleyer et al. |
| 8,841,469 B2 | 9/2014 | Sheppard et al. |
| 8,962,059 B1 | 2/2015 | Froderman et al. |
| 9,090,851 B2 | 7/2015 | Blankenburg et al. |
| 2001/0011105 A1 | 8/2001 | Noguchi et al. |
| 2001/0023752 A1 | 9/2001 | Keiser et al. |
| 2001/0030032 A1 | 10/2001 | Keiser et al. |
| 2003/0139517 A1 | 7/2003 | Nyander et al. |
| 2004/0092390 A1 | 5/2004 | Timken |
| 2005/0004236 A1 | 1/2005 | Workman et al. |
| 2005/0113462 A1 | 5/2005 | Persson et al. |
| 2005/0178070 A1 | 8/2005 | Workman et al. |
| 2005/0234136 A1 | 10/2005 | Holland et al. |
| 2006/0006116 A1 | 1/2006 | Scheimann et al. |
| 2006/0041152 A1 | 2/2006 | Cantrell et al. |
| 2006/0041153 A1 | 2/2006 | Cantrell et al. |
| 2006/0193700 A1 | 8/2006 | Putnam et al. |
| 2006/0194296 A1 | 8/2006 | Hammond et al. |
| 2007/0042094 A1 | 2/2007 | Warf, Jr. et al. |
| 2007/0210007 A1 | 9/2007 | Scheimann et al. |
| 2008/0108497 A1 | 5/2008 | Holland |
| 2008/0176298 A1 | 7/2008 | Randhava et al. |
| 2008/0299632 A1 | 12/2008 | Winsness et al. |
| 2009/0259060 A1 | 10/2009 | Cantrell et al. |
| 2010/0068519 A1 | 3/2010 | Holland et al. |
| 2010/0331580 A1 | 12/2010 | Ridgley |
| 2013/0319949 A1 | 12/2013 | Booth et al. |
| 2014/0171670 A1 | 6/2014 | Jenkins et al. |
| 2014/0251562 A1 | 9/2014 | Li et al. |
| 2014/0251565 A1 | 9/2014 | Wong Shing et al. |
| 2014/0275589 A1 | 9/2014 | Blankenburg et al. |
| 2015/0184112 A1 | 7/2015 | Lewis et al. |

FOREIGN PATENT DOCUMENTS

| | | |
|---|---|---|
| JP | H11-319439 A | 11/1999 |
| JP | 2004-203729 A | 7/2004 |
| WO | WO 91/07350 | 5/1991 |
| WO | WO 00/66491 A1 | 11/2000 |
| WO | WO 00/75074 A1 | 12/2000 |
| WO | WO 2015/030852 A1 | 3/2015 |
| WO | WO 2017/015180 A1 | 1/2017 |

OTHER PUBLICATIONS

European Patent Office, Written Opinion in International Patent Application No. PCT/US2016/042714, dated Sep. 20, 2016, 5 pp.

"The HLB System: A Time-Saving Guide to Emulsifier Selection," ICI Americas Inc., Wilmington, DE, 1984, 22 pp.

"The nomenclature of lipids (Recommendations 1976) IUPAC-IUB Commission on Biochemical Nomenclature," *Biochemical J.*, Apr. 1, 1978, 171(1), pp. 21-35.

Alther, "Put the Breaks on Wastewater Emulsions," *Chemical Engineering*, 105(3), Mar. 1998, pp. 82-88.

Babayan, "Specialty Lipids and Their Biofunctionality," *Lipids*, 22(6), Jun. 1987, pp. 417-420.

Davis, "Corn Milling, Processing and Generation of Co-Products," Minnesota Nutrition Conference, Technical Symposium, Sep. 11, 2001, 7 pp.

Frison-Norrie et al., "Investigating the Molecular Heterogeneity of Polysorbate Emulsifiers by MALDI-TOF MS," *J. of Agricultural and Food Chemistry*, 49(7), Jul. 2001, pp. 3335-3340.

Food and Agriculture Organization of the United Nations, "Sorbitan Monolaurate," C.A.S. No. 1228-39-2, 2000, downloaded from http://www.fao.org/ag/agn/jecfa-additives/specs/Monograph1/Additive-431.pdf on Sep. 17, 2015, 1 p.

Food and Agriculture Organization of the United Nations, "Sorbitan Monooleate," C.A.S. No. 1338-43-8, 2000, downloaded from http://www.fao.org/ag/agn/jecfa-additives/specs/Monograph1/Additive-432.pdf on Sep. 17, 2015, 1 p.

Food and Agriculture Organization of the United Nations, "Sorbitan Monostearate," C.A.S. No. 1338-41-6, 2000, downloaded from http://www.fao.org/ag/agn/jecfa-additives/specs/Monograph1/Additive-434.pdf on Sep. 17, 2015, 2 pp.

Hydrite Chemical Co., "Petition for Inter Partes Review of U.S. Pat. No. 8,841,469," Jul. 14, 2015, 73 pp.

Hydrite Chemical Co., "Petition for Inter Partes Review of U.S. Pat. No. 8,962,059," Jul. 14, 2015, 72 pp.

Iler, "The Chemistry of Silica," Hoboken, NJ, John Wiley & Sons, Inc., 1979, pp. 407-411.

Iler, "Multilayers of Colloidal Particles," *J. of Colloid and Interface Science*, 21(6), Jun. 1966, pp. 569-594.

Kadioglu et al., "Surfactant-Based Oil Extraction of Corn Germ," *J. Am. Oil Chem. Soc.*, 2011, 88, pp. 863-869.

Kim et al., "Comparison of the Properties of Silica Fine Particles Prepared by Using Batch and Semibatch Process," *J. of the Korean Institute of Chem. Engineers*, 39(3), Jun. 2000, pp. 398-404.

Klinkesorn et al., "Stability and Rheology of Corn Oil-in-Water Emulsions Containing Maltodextrin," *Food Research International*, 2004, 37, pp. 851-859.

Koros et al., "Terminology of Membranes and Membrane Processes," *J. of Membrane Science*, 120, 1996, pp. 149-159.

Lewis, "Colloid Chemistry," *Hawley's Condensed Chemical Dictionary*, 14th Edition, John Wiley & Sons, online @ http://knovel.com/web/portal/browse/display?_EXT_KNOVEL_DISPLAY_bookid=704&VerticalID=0, downloaded Jun. 18, 2010, 3 pp.

Maciel et al., "Multinuclear NMR Studies of Silica Surfaces," *Colloidal Silica*, 2006, pp. 425, 450-451.

McNaught et al., "Compendium of Chemical Terminology: IUPAC Recommendations," 2nd ed., Blackwell Science, Malden, MA, 1997, pp. 16, 166.

Mel, "Separations: Mechanical," *Encyclopedia of Chemical Engineering Equipment*, downloaded from http://encyclopedia.che.engin.umich.edu/Pages/SeparationsMechanical/SeparationsMechanical.html on Apr. 21, 2015, 2 pp.

(56) References Cited

OTHER PUBLICATIONS

Mel, "Separations: Mechanical," *Encyclopedia of Chemical Engineering Equipment*, downloaded from http://encyclopedia.che.engin.umich.edu/Pages/SeparationsMechanical/SeparationsMechanical.html on Aug. 15, 2016, 2 pp.

Menkhaus et al., "Polyelectrolyte flocculation of grain stillage for improved clarification and water recovery within bioethanol production facilities," *Bioresource Technology*, 101, 2010, pp. 2280-2286.

Mukerjee et al., "Critical Micelle Concentrations of Aqueous Surfactant Systems," National Standard Reference Data System, 1971, 7 pp.

Mukesh et al., "Lipase Catalysed Esterification of Isosorbide and Sorbitol," *Biotechnology Letters*, 15(12), Dec. 1993, pp. 1243-1246.

Potapov et al., "Research on the Use of Silica Extracted from the Hydrothermal Solutions," *Stanford Geothermal Workshop*, Jan. 1 to Feb. 1, 2012, 8 pp.

Potapov et al., "Silica Sols Production by Membrane Concentration of Hydrothermal Solutions," *Stanford Geothermal Workshop*, Feb. 1-3, 2010, 7 pp.

Roberts, "Manufacturing and Applications of Water-Borne Colloidal Silica," *Colloidal Silica*, 2006, pp. 131, 146-148.

Taherzadeh et al., "Enzyme-Based Hydrolysis Process for Ethanol from Lignocellulosic Materials: A Review," *BioResources*, 2007, 2(4), pp. 707-738.

Wang et al., "Effect of Low-Shear Extrusion on Corn Fermentation and Oil Partition," *J. Agric. Food Chem.*, 2009, 57, pp. 2302-2307.

CHEMICAL ADDITIVES TO IMPROVE OIL SEPARATION IN STILLAGE PROCESS OPERATIONS

CROSS-REFERENCE TO RELATED APPLICATIONS

This patent application is a continuation application of copending U.S. patent application Ser. No. 15/212,352, filed Jul. 18, 2016, which claims the benefit of U.S. Provisional Patent Application No. 62/194,195, filed Jul. 18, 2015, and U.S. Provisional Patent Application No. 62/194,196, filed Jul. 18, 2015, which are incorporated by reference.

BACKGROUND OF THE INVENTION

Seeking a renewable substitute for petroleum-based energy fuels, much effort has been invested in the production of ethanol from biological sources such as dry grind ethanol processes. Recently a number of attempts have been made to extract oil from the stillage process streams due to its high value as a human consumable product. Surfactants have been utilized in oil separation processes to increase the amount of oil extracted from stillage. Such processes generally involve the use of a surfactant at the water-oil interface of oil droplets to extract the oil droplets from the aqueous phase, followed by separation of the oil by centrifuge.

Grain stillage often comprises entrapped oil, i.e., oil located within or adhered to the surface or other regions of aggregates of solids materials. Entrapped oil is difficult to separate from stillage because solid aggregates can block a surfactant's access to the oil. Grain stillage often has a high solid content, and thus has a large amount of oil trapped within solid aggregates. Extraction of oil trapped in solid aggregates can greatly increase the total amount of oil captured from a stillage process.

There is a need for more efficient and productive methods and compositions for grain to ethanol processes.

BRIEF SUMMARY OF THE INVENTION

In an embodiment, the invention provides a method of recovering oil from a grain to ethanol process. The method comprises adding at least one surfactant and at least one microparticle to a grain to ethanol process, wherein the microparticle comprises hydrophilic silica.

In another embodiment, the invention provides a composition for recovering oil from a grain to ethanol process. The composition comprises ethanol stillage and a microparticle comprising hydrophilic silica.

DETAILED DESCRIPTION OF THE INVENTION

Figure 1:
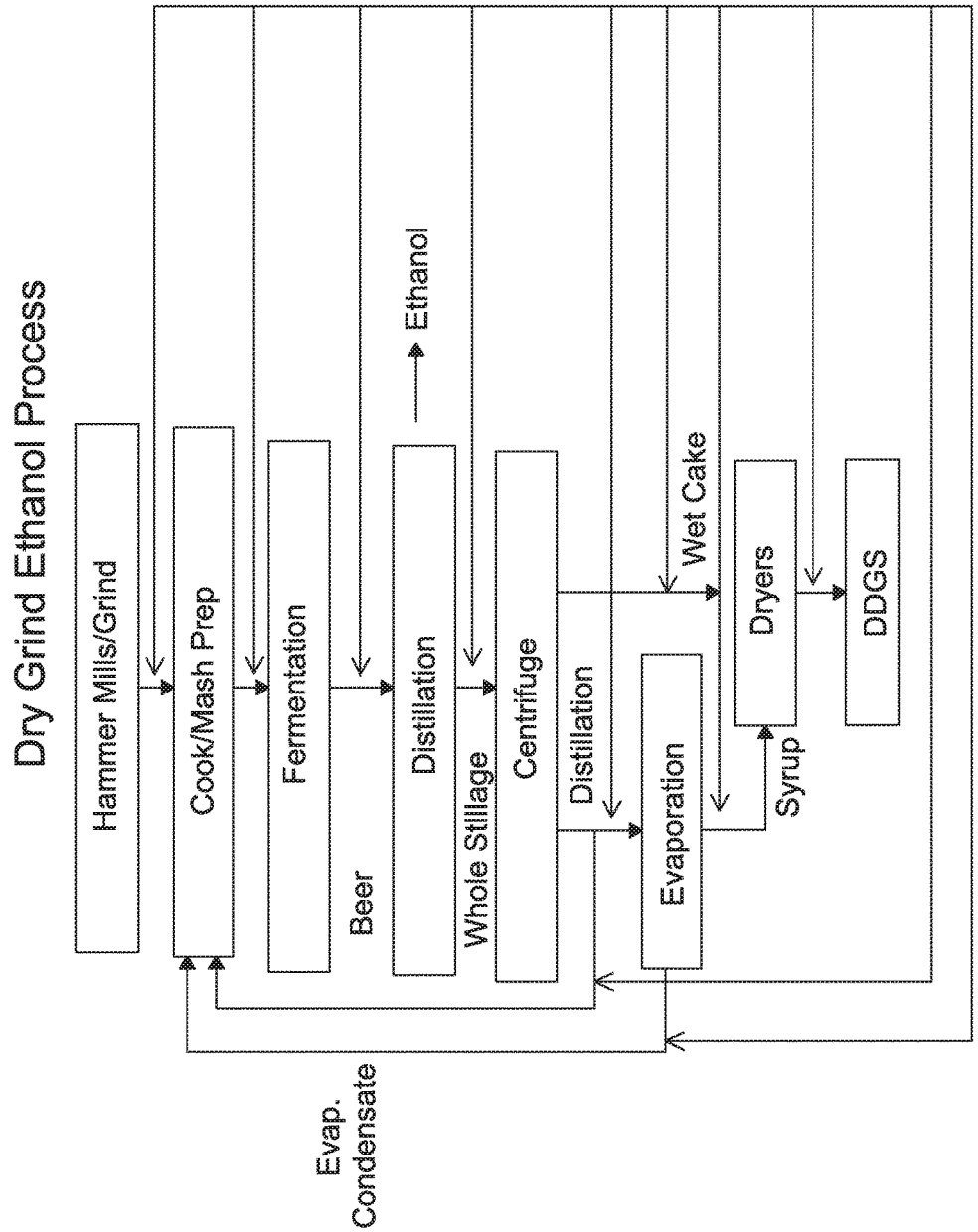
FIG. 1 is a flowchart of a dry grind ethanol processing operation in accordance with an embodiment of the invention.

The following definitions are provided to determine how terms used in this application, and in particular how the claims, are to be construed. The organization of the definitions is for convenience only and is not intended to limit any of the definitions to any particular category.

"Backset" refers to the portion of thin stillage that is returned to the front of plant and mixed with grain for additional ethanol production.

"Colloidal silica" refers to a suspension of silica particles in a liquid phase.

"Concentrated thin stillage" means a portion of the thin stillage stream that has passed through a concentration or evaporation stage and ranges between what would be considered "backset" and what would be considered "syrup."

"Consisting essentially of" means that the methods and compositions may include additional steps, components, ingredients or the like, but only if the additional steps, components and/or ingredients do not materially alter the basic and novel characteristics of the claimed methods and compositions.

"Droplet" means a mass of dispersed phase matter surrounded by continuous phase liquid. The droplet may be suspended solid or a dispersed liquid.

"Interface" refers to the surface forming a boundary between two or more phases of a liquid system.

"Microparticle" generally refers to particles that are too small to see by the naked eye because they are smaller than the wavelength of visible light.

"Separation" means a mass transfer process that converts a mixture of substances into two or more distinct product mixtures, at least one of which is enriched in one or more of the mixture's constituents, including but not limited to processes such as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Solids" refers to the non-water portions of grain that remain in stillage after distillation including but not limited to one or more of: fats, germ, protein, gluten, hull, and carbohydrates.

"Stillage" is a broad term whose meaning encompasses whole stillage, thin stillage, and/or thick stillage either as generated in the process or in a concentrated form.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, of which both are incorporated by reference herein.

"Thick stillage" and "syrup" are used interchangeably and refer to the liquid mixture remaining after evaporation of ethanol from thin stillage in a grain to ethanol process.

"Thin stillage" refers to the portion of a grain processing stream remaining after the whole stillage has passed through a centrifuge where the more heavy wet cake has been removed.

"Whole stillage" refers to the portion of a grain processing mixture remaining after the grain-based material has passed through a distillation process where ethanol has been removed.

This invention relates to methods and compositions for improving the separation of oil from a stillage process. In particular, the invention provides methods and compositions for improving the extraction of oil from a grain to ethanol process. The methods of the present invention include adding at least one surfactant and at least one microparticle to a grain stillage to improve extraction of oil from the stillage. The microparticle comprises hydrophilic silica. Applicants have surprisingly and unexpectedly discovered that the addition of a surfactant and microparticle comprising hydrophilic silica to a grain stillage greatly increases the amount of oil extracted from the stillage. The present method is in contrast to existing methods which employ hydrophobic silica to extract oil from a stillage.

Without wishing to be bound by any particular theory, it is believed that use of the microparticle of the present methods results in a disaggregation effect, resulting in displacement of oil trapped in the solid aggregates. This disaggregation effect may be due to charge-charge interactions, as well as impact collision effects between the aggregates and the microparticle. Without wishing to be bound by any particular theory, it is believed that the microparticle of the present method breaks up solid aggregates, releasing the oil trapped within the solid aggregate. By disaggregating entrapped oil, the entrapped oil becomes bulk oil and is then available for oil collection by the surfactant. The released oil is free to interact with surfactant, resulting in an increase in oil recovered from the grain stillage. Due to the high solids content of various stillages (e.g., corn syrup may contain 17% to 34% solids), extraction of trapped oil can greatly increase the overall oil extracted from a stillage.

In an embodiment, the invention provides a method of recovering oil from a grain to ethanol process. The method comprises adding at least one surfactant and at least one microparticle comprising hydrophilic silica to a grain to ethanol process.

In certain preferred embodiments, at least one surfactant and at least one microparticle are added to a process stream in a grain to ethanol process. In certain preferred embodiments, at least one surfactant and at least one microparticle are added to thick stillage of a grain to ethanol process. In certain preferred embodiments, at least one surfactant and at least one microparticle are added to a corn to ethanol process. In certain preferred embodiments, at least one surfactant and at least one microparticle are added to a dry grind corn to ethanol process.

In certain embodiments, the hydrophilic silica is colloidal silica, precipitated silica, fumed silica, or a combination thereof. In certain preferred embodiments, the hydrophilic silica is colloidal silica.

In certain preferred embodiments, the colloidal silica is an aqueous suspension. In certain embodiments, the aqueous colloidal silica suspension has a solids contents in an amount of from about 16% to about 18% by weight based on weight of $SiO_2$ solids.

In certain embodiments, the hydrophilic silica has a particle size of from about 0.1 nm to about 500 nm. Thus, in certain embodiments, the hydrophilic silica has a particle size of from about 0.1 nm to about 500 nm, from about 0.1 nm to about 450 nm, from about 0.1 nm to about 400 nm, from about 0.1 nm to about 350 nm, from about 0.1 nm to about 300 nm, from about 0.1 nm to about 250 nm, from about 0.1 nm to about 200 nm, from about 0.1 nm to about 150 nm, from about 0.1 nm to about 100 nm, from about 0.1 nm to about 75 nm, from about 0.1 nm to about 50 nm, from about 0.1 nm to about 40 nm, from about 0.1 nm to about 30 nm, from about 0.1 nm to about 25 nm, from about 0.1 nm to about 20 nm, from about 0.1 nm to about 15 nm, from about 0.1 nm to about 10 nm, from about 1 nm to about 500 nm, from about 1 nm to about 400 nm, from about 1 nm to about 250 nm, from about 1 nm to about 100 nm, from about 1 nm to about 50 nm, from about 5 nm to about 200 nm, or from about 10 nm to about 100 nm. In certain preferred embodiments, the hydrophilic silica has a particle size of from about 0.1 nm to about 100 nm. In certain preferred embodiments, the hydrophilic silica has a particle size of from about 0.1 nm to about 50 nm. The particle size may be a $D_{50}$ particle size.

In certain embodiments, the hydrophilic silica has a particle size of from about 0.01 µm to about 200 µm. Thus, in certain embodiments, the hydrophilic has a particle size of from about 0.01 µm to about 200 µm, from about 0.01 µm to about 150 µm, from about 0.01 µm to about 100 µm, from about 0.01 µm to about 75 µm, from about 0.01 µm to about 50 µm, from about 0.01 µm to about 40 µm, from about 0.01 µm to about 30 µm, from about 0.01 µm to about 25 µm, from about 0.01 µm to about 10 µm, from about 1 µm to about 200 µm, from about 1 µm to about 200 µm, from about 10 µm to about 200 µm, or from about 10 µm to about 100 µm. In certain preferred embodiments, the hydrophilic silica has a particle size of from about 0.01 µm to about 50 µm. The particle size may be a $D_{50}$ particle size.

In certain embodiments, the hydrophilic silica has a surface area of from about 50 $m^2/g$ to about 600 $m^2/g$. Thus, in certain embodiments, the hydrophilic silica has a surface area of from about 50 $m^2/g$ to about 600 $m^2/g$, from about 50 $m^2/g$ to about 550 $m^2/g$, from about 50 $m^2/g$ to about 500 $m^2/g$, from about 50 $m^2/g$ to about 450 $m^2/g$, from about 50 $m^2/g$ to about 400 $m^2/g$, from about 50 $m^2/g$ to about 300 $m^2/g$, from about 100 $m^2/g$ to about 600 $m^2/g$, from about 100 $m^2/g$ to about 550 $m^2/g$, from about 100 $m^2/g$ to about 500 $m^2/g$, from about 100 $m^2/g$ to about 450 $m^2/g$, from about 100 $m^2/g$ to about 400 $m^2/g$, or from about 100 $m^2/g$ to about 350 $m^2/g$. In certain embodiments, the hydrophilic silica is fumed silica having a surface area of from about 250 $m^2/g$ to about 350 $m^2/g$. In certain preferred embodiments, the hydrophilic silica is colloidal silica having a surface area of from about 300 $m^2/g$ to about 500 $m^2/g$. The surface area may be a BET (Brunauer, Emmett, Teller) surface area.

In certain embodiments, the hydrophilic silica has a surface area of from about 500 m$^2$/g to about 1,000 m$^2$/g. Thus, in certain embodiments, the hydrophilic silica has a surface area of from about 500 m$^2$/g to about 1,000 m$^2$/g, from about 500 m$^2$/g to about 900 m$^2$/g, from about 500 m$^2$/g to about 850 m$^2$/g, from about 550 m$^2$/g to about 1,000 m$^2$/g, from about 600 m$^2$/g to about 1,000 m$^2$/g, from about 650 m$^2$/g to about 1,000 m$^2$/g, from about 700 m$^2$/g to about 1,000 m$^2$/g, from about 750 m$^2$/g to about 1,000 m$^2$/g, from about 550 m$^2$/g to about 950 m$^2$/g, from about 600 m$^2$/g to about 950 m$^2$/g, from about 650 m$^2$/g to about 950 m$^2$/g, from about 700 m$^2$/g to about 950 m$^2$/g, from about 750 m$^2$/g to about 950 m$^2$/g, from about 550 m$^2$/g to about 900 m$^2$/g, from about 600 m$^2$/g to about 900 m$^2$/g, from about 650 m$^2$/g to about 900 m$^2$/g, from about 700 m$^2$/g to about 900 m$^2$/g, from about 550 m$^2$/g to about 850 m$^2$/g, from about 600 m$^2$/g to about 850 m$^2$/g, from about 650 m$^2$/g to about 850 m$^2$/g, from about 700 m$^2$/g to about 850 m$^2$/g, from about 750 m$^2$/g to about 850 m$^2$/g, from about 750 m$^2$/g to about 800 m$^2$/g, from about 800 m$^2$/g to about 850 m$^2$/g, 850 m$^2$/g to about 900 m$^2$/g, or from about 850 m$^2$/g to about 950 m$^2$/g. In certain embodiments, the hydrophilic silica is colloidal silica having a surface area of from about 750 m$^2$/g to about 900 m$^2$/g. The surface area may be a BET (Brunauer, Emmett, Teller) surface area.

In certain embodiments, the hydrophilic silica has a surface area of at least about 500 m$^2$/g. Thus, in certain embodiments, the hydrophilic silica has a surface area of at least about 500 m$^2$/g, at least about 550 m$^2$/g, at least about 600 m$^2$/g, at least about 650 m$^2$/g, at least about 700 m$^2$/g, at least about 750 m$^2$/g, at least about 800 m$^2$/g, or at least about 850 m$^2$/g.

In certain embodiments, an aqueous colloidal silica suspension that is added to an aqueous medium has a viscosity of from about 4 cps to about 20 cps. Thus, in certain embodiments, an aqueous colloidal silica suspension that is added to an aqueous medium has a viscosity of from about 4 cps to about 20 cps, from about 4 cps to about 18 cps, from about 4 cps to about 15, from about 4 cps to about 12 cps, from about 4 cps to about 10 cps, from about 4 cps to about 8 cps, from about 6 cps to about 20 cps, from about 8 cps to about 20 cps, from about 10 cps to about 20 cps, from about 12 cps to about 20 cps, from about 6 cps to about 18 cps, from about 6 cps to about 16 cps, or from about 5 cps to about 15 cps.

The S-value of the colloidal silica is another parameter of colloidal silica. S-value is a quantification of the degree of microaggregation of colloidal materials. The exact definition of S-value can be found in *The Chemistry of Silica: Solubility, Polymerization, Colloid and Surface Properties and Biochemistry of Silica*, by Ralph K. Iler, John Wiley and Sons, Inc. (1979). In certain embodiments, the colloidal silica has an S-value of from about 20% to about 50%. Thus, in certain embodiments, the colloidal silica has an S-value of from about 20% to about 50%, from about 22% to about 50%, from about 24% to about 50%, from about 26% to about 50%, from about 28% to about 50%, from about 30% to about 50%, from about 22% to about 46%, from about 22% to about 42%, from about 22% to about 38%, from about 26% to about 48%, from about 26% to about 46%, from about 26% to about 44%, from about 26% to about 42%, from about 26% to about 40%, from about 26% to about 38%, from about 26% to about 36%, from about 28% to about 40%, from about 29% to about 39%, from about 30% to about 50%, from about 32% to about 50%, or from about 34% to about 50%.

In certain embodiments, the colloidal silica has an S-value of at least about 20%, at least about 22%, at least about 24%, at least about 26%, at least about 28%, at least about 30%, at least about 32%, or at least about 35%.

In certain embodiments, the microparticle is added to stillage in an amount of at least about 50 ppm, at least about 100 ppm, at least about 200 μm, or at least about 300 ppm, based on weight of the stillage. In certain embodiments, the microparticle is added to stillage in an amount of about 10,000 ppm or less, about 5,000 ppm or less, about 2,500 ppm or less, about 1,500 ppm or less, or about 1,000 ppm or less, based on weight of the stillage.

In certain embodiments, the microparticle is added to a stillage in an amount of from about 0.01 ppm to about 5,000 ppm, based on weight of the stillage. Thus, in certain embodiments, the microparticle is added to a stillage in an amount of from about 0.01 ppm to about 5,000 ppm, from about 0.01 ppm to about 4,000 ppm, from about 0.01 ppm to about 3,000 ppm, from about 0.01 ppm to about 2,000 ppm, from about 0.01 ppm to about 1,000 ppm, from about 0.01 ppm to about 750 ppm, from about 0.01 ppm to about 500 ppm, from about 0.01 ppm to about 400 ppm, from about 0.01 ppm to about 300 ppm, from about 0.01 ppm to about 250 ppm, from about 0.01 ppm to about 200 ppm, from about 0.01 ppm to about 150 ppm, or from about 0.01 ppm to about 100 ppm, based on weight of the stillage. In certain preferred embodiments, the microparticle is added to stillage in an amount of from about 300 ppm to about 1300 ppm, based on weight of the stillage. In certain preferred embodiments, the microparticle is added to stillage in an amount of from about 500 ppm to about 1000 ppm, based on weight of the stillage.

The microparticle may comprise, consist essentially of, or consist of hydrophilic silica. In certain embodiments, the microparticle consists of or consists essentially of hydrophilic colloidal silica.

In certain embodiments, the microparticle further comprises a sol, aquasol, dispersed form of silica, a siliceous material, silica based particle, silica microgel, colloidal silica, silica sol, silica gel, polysilicate, cationic silica, alumina silicate, poly-alumina silicate, borosilicates, polyborosilicates, zeolites, swelling clays, anionic microparticles, cationic microparticles, organic microparticles, amphoteric microparticles, or a combination thereof.

In certain embodiments, the microparticle further comprises a siliceous material. Representative siliceous materials include silica based particles, silica microgels, colloidal silica, silica sols, silica gels, polysilicates, cationic silica, aluminosilicates, polyaluminosilicates, borosilicates, polyborosilicates, zeolites, and synthetic or naturally occurring swelling clays. The swelling clays may be bentonite, hectorite, smectite, montmorillonite, nontronite, saponite, sauconite, mormite, attapulgite, sepiolite, or a combination thereof.

In certain embodiments, the microparticle further comprises a polymeric microparticle. Polymeric microparticles useful in this invention include anionic, cationic, or amphoteric organic microparticles. In certain embodiments, the microparticles have limited solubility in water, may be crosslinked, and may have an unswollen particle size of less than 750 nm.

Anionic organic microparticles include those described in U.S. Pat. No. 6,524,439 and made by hydrolyzing acrylamide polymer microparticles or by polymerizing anionic monomers as (meth)acrylic acid and its salts, 2-acrylamido-2-methylpropane sulfonate, sulfoethyl-(meth)acrylate, vinylsulfonic acid, styrene sulfonic acid, maleic or other dibasic acids or their salts or mixtures thereof. These anionic monomers may also be copolymerized with nonionic monomers such as (meth)acrylamide, N-alkylacrylamides, N,N-dialkylacrylamides, methyl(meth)acrylate, acrylonitrile, N-vinyl methylacetamide, N-vinyl methyl formamide, vinyl acetate, N-vinyl pyrrolidone, and mixtures thereof.

Cationic organic microparticles include those described in U.S. Pat. No. 6,524,439 and made by polymerizing such monomers as diallyldialkylammonium halides, acryloxyalkyltrimethylammonium chloride, (meth)acrylates of dialkylaminoalkyl compounds, and salts and quaternaries thereof and, monomers of N,N-dialkylaminoalkyl(meth)acrylamides, (meth)acrylamidopropyltrimethylammonium chloride and the acid or quaternary salts of N,N-dimethylaminoethylacrylate and the like. These cationic monomers may also be copolymerized with nonionic monomers such as (meth)acrylamide, N-alkylacrylamides, N,N-dialkylacrylamides, methyl(meth)acrylate, acrylonitrile, N-vinyl methylacetamide, N-vinyl methyl formamide, vinyl acetate, N-vinyl pyrrolidone, and mixtures thereof.

Amphoteric organic microparticles may be made by polymerizing combinations of at least one of the anionic monomers listed above, at least one of the cationic monomers listed above, and, optionally, at least one of the nonionic monomers listed above.

Polymerization of the monomers in an organic microparticle typically is done in the presence of a polyfunctional crosslinking agent. These crosslinking agents are described in U.S. Pat. No. 6,524,439 as having at least two double bonds, a double bond and a reactive group, or two reactive groups. Examples of these agents are N,N-methylenebis(meth)acrylamide, polyethyleneglycol di(meth)acrylate, N-vinyl acrylamide, divinylbenzene, triallylammonium salts, N-methylallylacrylamide glycidyl(meth)acrylate, acrolein, methylolacrylamide, dialdehydes like glyoxal, diepoxy compounds, and epichlorohydrin.

In certain embodiments, the surfactant is a polyol compound. In certain embodiments, the surfactant is a sorbitol, sorbitan, or isosorbide. In certain embodiments, the surfactant is a sorbitol, sorbitan, or isosorbide derivative. In certain preferred embodiments, the surfactant is a functionalized alkoxylated polyol derived from a sorbitol, sorbitan, or isosorbide.

In certain preferred embodiments, the surfactant is a polysorbate. In certain preferred embodiments, the polysorbate is a sorbitan alkoxylated alkylate. In certain preferred embodiments, the polysorbate is an alkoxylated sorbitan monoalkylate, alkoxylated sorbitan dialkylate, alkyoxylated sorbitan trialkylate, or combinations thereof. In certain embodiments, the alkoxylated sorbitan alkylate comprises from about 1 to about 100 alkylene oxide units. In certain embodiments, the alkoxylated sorbitan alkylate comprises from about 5 to about 50 alkylene oxide units. In certain embodiments, the alkoxylated sorbitan alkylate comprises from about 10 to about 30 alkylene oxide units. In certain other embodiments, the alkoxylated sorbitan alkylate comprises from about 12 to about 25 alkylene oxide units.

In certain embodiments, the alkoxylated sorbitan alkylate comprises from about 1 to about 100 ethylene oxide and/or propylene oxide units. In certain embodiments, the alkoxylated sorbitan alkylate comprises from about 5 to about 50 ethylene oxide and/or propylene oxide units. In certain embodiments, the alkoxylated sorbitan alkylate comprises from about 10 to about 30 ethylene oxide and/or propylene oxide units. In certain other embodiments, the alkoxylated sorbitan alkylate comprises from about 12 to about 25 ethylene oxide and/or propylene oxide units.

In certain embodiments, the alkoxylated sorbitan alkylate has an alkyl ester chain length of from about 4 to about 24 carbons. In certain embodiments, the alkoxylated sorbitan alkylate has an alkyl ester chain length of from about 8 to about 20 carbons. In certain embodiments, the alkoxylated sorbitan alkylate has an alkyl ester chain comprising one or more olefins.

In certain preferred embodiments, the polysorbate is a polyoxyethylene sorbitan monooleate, polyoxyethylene sorbitan monolaurate, polyoxyethylene sorbitan monopalmitate, polyoxyethylene sorbitan monostearate, or combinations thereof. In certain preferred embodiments, the polysorbate is a polyoxyethylene sorbitan monooleate. In certain embodiments, the polyoxyethylene sorbitan ester comprises from about 1 to about 100 ethylene oxide units. In certain embodiments, the polyoxyethylene sorbitan ester comprises from about 5 to about 50 ethylene oxide units. In certain embodiments, the polyoxyethylene sorbitan ester comprises from about 10 to about 30 ethylene oxide units. In certain embodiments, the polyoxyethylene sorbitan ester comprises from about 12 to about 25 ethylene oxide units. In certain preferred embodiments, the polyoxyethylene sorbitan ester comprises about 20 ethylene oxide units.

In certain other embodiments, the surfactant is an alkoxylated fatty alcohol, alkoxylated fatty acid, sulfonated alkoxylate, alkyl quaternary ammonium compound, alkyl amine compound, alkyl phenol ethoxylate, or a combination thereof.

In certain embodiments, the surfactant is anionic, nonionic, cationic, zwitterionic, or a combination thereof.

Other representative surfactants useful in certain embodiments of the invention include but are not limited to nonionic, anionic, zwitterionic, and cation surfactants. Other useful surfactants include sulfates, sulfosuccinates, phosphates, and agrichemical surfactants, and combinations thereof.

Non-limiting examples of nonionic surfactants include polyethylene glycol, polypropylene glycol, polyoxythylene polyoxypropylene alkyl ether, polyoxyethylene monomethyl ether, polyoxyethylene monoallyl ether, polyoxythylene neopentyl ether, polyoxythylene bisphenol-A ether, polyoxythylene glycerine ether, polyoxyethylene polyoxypropylene derivatives, polyoxyethylene polyoxypropylene alkyl ether, ethylene oxide/propylene oxide copolymers (EO/PO) random copolymer, EO/PO block copolymer, polyoxypropylene polyoxyethylene alkylether copolymer, polyoxyethylene nonylphenyl ether (branched), polyoxyethylene octylphenyl ether, polyoxyethylene phenyl ether, polyoxyethylene β-naphthyl ether, polyoxyethylene 2-ethylhexyl ether, polyoxyethylene decyl ether, polyoxyethylene lauryl ether, polyoxyethylene syn.laury ether, polyoxyethylene isotridecyl ether, polyoxyethylene cetyl ether, polyoxyethylene oleyl ether, polyoxyethylene stearyl ether, polyoxyethylene lauryl ester, polyoxyethylene coconut fatty ester, polyoxyethylene oleyl ester, polyoxyethylene stearyl ester, polyoxyethylene lauryl amine, polyoxyethylene oleyl amine, polyoxyethylene stearyl amine, polyoxyethylene tallow amine, polyoxyethylene castor ether, polyoxyethylene hydrogenated castor ether, polyoxyethylen styrenated phenyl ether, polyoxyethylene isodecyl ether, polyoxyethylene bisphenol F ether, polyoxyethylene distearate, polyoxyethylene trimethylol propane ether, polyoxyethylene polyoxypropylene decyl ether, polyoxyethylene polyoxypropylene octyl ether, polyoxyethylene polyoxypropylene isodecyl ether, polyoxyethylene alkylphenyl ether, and combinations thereof.

Non-limiting examples of (anionic) sulfate & sulfosuccinates include one or more of: soduim dodecyl benzene sulfonate, ammonium dodecyl benzene sulfonate, sodium polyoxyethylene alkyl aryl sulfate, ammonium polyoxyethylene alkyl sulfate, ammonium polyoxyethylene alkyl aryl sulfate, polyoxyethylene alkylphenyl ether ammonium sulfate, sodium bis(2-ethylhexyl) sulfosuccinate, ammonium tristyrenated alkyl phenol sulfate, sodium polyoxyethylene alkyl sulfate, disodium polyoxyethylene aryl half ester of sulfosuccinate, and any combination thereof.

Non-limiting examples of phosphates include one or more of: polyoxyethylene aryl ether phosphate, alkyl phosphate, polyoxyethylene alkyl ether phosphate, alkyl ether phosphate, and combinations thereof.

Non-limiting examples of agrichemical surfactants include (with or without calcium salt, and/or Xylene) one or more of: polyethylene glycol mono(tristyrylphenyl) ether, dodecylbenzenesulfonic acid, polyoxyethylene nonylphenol, dodecylbenzenesulfonic acid, polyethylene glycol mono(tristyrylphenyl) ether, dodecylbenzenesulfonic acid, polyethylene glycol mono(tristyrylphenyl) ether, dodecylbenzenesulfonic acid, polyoxyethylene nonphenol, dodecylbenzenesulfonic acid, polyoxyethylene nonylphenol, dodecylbenzenesulfonic acid, castor oil, ethoxylated, polyethylene glycol mono(tristyrylphenyl) ether, dodecylbenzenesulfonic acid, castor oil, ethoxylated xylene, polyethylene glycol mono(tristyrylphenyl) ether, ethoxylated polyethylene glycol, acrylic acid polymer, sodium bis(2-ethylhexyl) sulfocuccinate, sodium bis(2-ethylhexyl) sulfosucciante, nonylphenol, ethoxylated, moneother with sulfuric acid, triethanolamine compound with poly(oxyethylene)-tristyrylphenyl ether phosphate, popylene glycol, 3(2H)-isothiazilone, 5-chloro-2-methyl-3(2H)-isothiazilone, magnesium chloride, aluminium magnesium silicate, poly(oxy (dimethylsilylene)), propylene glycol, xanthan gum, polyethylene glycol, nonylphenol, ethoxylated monoether with sulfuric acid, ammonium salt, lignosulfonic acid, sodium salt, silicon dioxide, nonylphenol, ethoxylated monoether with sulfuric acid, lignosulfonic acid, dodecyl sulfate, and combinations thereof.

Non-limiting examples of anionic surfactants include one or more of: sodium dodecyl benzene sulfonate, ammonium dodecyl benzene sulfonate, sodium polyoxyethylene alkyl aryl sulfate, ammonium polyoxyethylene alkyl aryl sulfate, polyoxyethylene alkylphenyl ether, ammonium sulfate, sodium bis(2-ethylhexyl) sulfosuccinate, ammonium tristyrenated alkyl phenol sulfate, sodium polyoxyethylene alkyl sulfate, sodium polyoxyethylene alkyl aryl sulfate, ammonium polyoxyethylene alkyl sulfate, disodium polyoxyethylene aryl half ester of sulfosuccinate, disodium polyoxyethylene alkyl half ester of sulfosuccinate, and combinations thereof.

In certain embodiments, the surfactant is added to a stillage in an amount of at least about 50 ppm, at least about 100 ppm, at least about 200 μm, or at least about 300 ppm, based on the weight of stillage. In certain embodiments, the surfactant is added to stillage in an amount of about 10,000 ppm or less, about 5,000 ppm or less, about 2,500 ppm or less, about 1,500 ppm or less, or about 1,000 ppm or less, based on weight of the stillage.

In certain embodiments, the surfactant is added to a stillage in an amount of from about 0.01 ppm to about 5,000 ppm, based on weight of the stillage. Thus, in certain embodiments, the surfactant is added to a stillage in an amount of from about 0.01 ppm to about 5,000 ppm, from about 0.01 ppm to about 4,000 ppm, from about 0.01 ppm to about 3,000 ppm, from about 0.01 ppm to about 2,000 ppm, from about 0.01 ppm to about 1,000 ppm, from about 0.01 ppm to about 750 ppm, from about 0.01 ppm to about 500 ppm, from about 0.01 ppm to about 400 ppm, from about 0.01 ppm to about 300 ppm, from about 0.01 ppm to about 250 ppm, from about 0.01 ppm to about 200 ppm, from about 0.01 ppm to about 150 ppm, from about 0.01 ppm to about 100 ppm, from about 1 ppm to about 1,000 ppm, from about 10 ppm to about 1,000 ppm, or from about 1 ppm to about 300 ppm, based on weight of the stillage. In certain preferred embodiments, the surfactant is added to stillage in an amount of from about 100 ppm to about 1500 ppm, based on weight of the stillage. In certain preferred embodiments, the surfactant is added to stillage in an amount of from about 500 ppm to about 1000 ppm, based on weight of the stillage. In certain preferred embodiments, the surfactant is added to stillage in an amount of from about 250 ppm to about 450 ppm, based on weight of the stillage.

In certain embodiments, hydrophilic silica is added to a stillage in an amount of from about 0.01 ppm to about 5,000 ppm, based on weight of the stillage. Thus, in certain embodiments, hydrophilic silica is added to a stillage in an amount of from about 0.01 ppm to about 5,000 ppm, from about 0.01 ppm to about 4,000 ppm, from about 0.01 ppm to about 3,000 ppm, from about 0.01 ppm to about 2,000 ppm, from about 0.01 ppm to about 1,000 ppm, from about 0.01 ppm to about 750 ppm, from about 0.01 ppm to about 500 ppm, from about 0.01 ppm to about 400 ppm, from about 0.01 ppm to about 300 ppm, from about 0.01 ppm to about 250 ppm, from about 0.01 ppm to about 200 ppm, from about 0.01 ppm to about 150 ppm, from about 0.01 ppm to about 100 ppm, from about 0.01 ppm to about 75 ppm, from about 0.01 ppm to about 50 ppm, from about 0.01 ppm to about 40 ppm, from about 0.01 ppm to about 25 ppm, from about 1 ppm to about 1,000 ppm, from about 10 ppm to about 1,000 ppm, from about 1 ppm to about 300 ppm, or from about 1 ppm to about 100 ppm, based on weight of the stillage. In certain preferred embodiments, the hydrophilic silica is added to stillage in an amount of from about 15 ppm to about 300 ppm, based on weight of the stillage. In certain preferred embodiments, the hydrophilic silica is added to stillage in an amount of from about 50 ppm to about 200 ppm, based on weight of the stillage.

In certain embodiments, silica is added to a hydrophilic stillage in an amount of about 10,000 ppm or less, about 5,000 ppm or less, about 2,500 ppm or less, about 1,500 ppm or less, or about 1,000 ppm or less, based on weight of the stillage.

In certain preferred embodiments, the surfactant is polysorbate and the silica is colloidal silica. In certain preferred embodiments, the polysorbate and colloidal silica are added to a thick stillage or syrup.

Surfactant and silica can be added to a grain to ethanol process at any suitable ratio. In certain preferred embodiments, the surfactant is added to a grain to ethanol process in an amount greater than the amount of silica. In certain preferred embodiments, the surfactant and silica are added to a grain to ethanol process at a ratio of from about 20 to 1 to about 2 to1. In certain embodiments, the surfactant and silica are added to a grain to ethanol process at a ratio of from about 20 to 1 to about 4 to 1. In certain embodiments, the surfactant and silica are added to a grain to ethanol process at a ratio of from about 15 to 1 to about 2 to 1. In certain embodiments, the surfactant and silica are added to a grain to ethanol process at a ratio of from about 10 to 1 to about 2 to 1. In certain embodiments, the surfactant and silica are added to a grain to ethanol process at a ratio of from about 10 to 1 to about 4 to 1. In certain embodiments, the surfactant and silica are added to a grain to ethanol process at a ratio of from about 10 to 1 to about 5 to 1. In certain preferred embodiments, the surfactant and silica is added to a grain to ethanol process at a ratio of from about 10 to 1 to about 1 to 1. In certain preferred embodiments, the surfactant and silica is added to a grain to ethanol process at a ratio of from about 6 to 1 to about 3 to 1.

In certain embodiments, the amount of oil extracted from a stillage treated with a microparticle is greater than the amount of oil extracted in the absence of a microparticle. In certain embodiments, the amount of trapped oil extracted from a stillage treated with a microparticle is greater than the amount of oil extracted in the absence of a microparticle.

In certain preferred embodiments, at least one surfactant and at least one microparticle comprising hydrophilic silica is added to a whole stillage, thin stillage, syrup (i.e., thick stillage), wet cake, wet grain, dry distiller grain, beer, beer mash, backset, wet grain, or a combination thereof. In certain preferred embodiments, at least one surfactant and at least one microparticle comprising hydrophilic silica are added to a thick stillage.

In certain embodiments, the surfactant and microparticle are added to a stillage comprising total solids in an amount of from about 1% to about 40% by weight, based on weight of the stillage. Thus, in certain embodiments, the surfactant and microparticle are added to stillage comprising total solids in an amount of from about 1% to about 40%, from about 1% to about 30%, from about 5% to about 40%, from about 5% to about 35%, from about 10% to about 35%, from about 15% to about 35%, or from about 20% to about 40% by weight, based on weight of the stillage.

In certain embodiments, the surfactant and/or microparticle are added to the whole stillage process stream prior to removal of the wet cake, the thin stillage process stream at the inlet and/or outlets of one or more of the evaporators, in the evaporator, at the inlet to the pre-mix or retention heat tanks, to the syrup just prior to the oil separation centrifuge, or combination thereof. The surfactant and/or the microparticle may be introduced to the stillage process stream at any point or location along the stillage process operation or even upstream at any point in the ethanol manufacturing operation. The microparticle and/or surfactant may be added to any form of process equipment used in the operation including but not limited to a centrifuge, heater, conduit, pipeline, pump, column, heat exchanger, heater, filter, separation device, and/or vat, tank, as well as to any raw material, source material, byproduct, intermediate product, end product, and combinations thereof. In certain embodiments, the surfactant and/or microparticles are added to the main process line, to a side stream, and/or to a sample diverted off of the process line.

FIG. 1 shows a non-limiting example of a stillage process operation through which a stillage process stream flows and includes some of the possible introduction points (1) into which the microparticle and/or surfactant may be added. In a dry milling process for manufacturing ethanol a feed source such as corn is ground up and processed to produce a "beer" or "beer mash" which is fermented to form ethanol. Once the stream reaches the desired ethanol content the material it's then transferred to a stripper column. The stripper column facilitates recovery and removal of the ethanol and the remainder, known as whole stillage is passed on for further processing.

In certain embodiments, the surfactant and microparticle are added separately to a grain to ethanol process. The surfactant and microparticle may be added in any order. It has been observed that, in certain embodiments, the combination of a surfactant and microparticle produces a thick gel that is difficult to manipulate, administer, and/or distribute in a stillage. Therefore, in certain embodiments, the surfactant and microparticle are not pre-mixed prior to adding to a grain to ethanol process, but added separately.

The surfactant and microparticle may be added to a stillage having any suitable temperature or pH. In certain embodiments, the surfactant and microparticle are added to a stillage having a temperature of from about 100° F. to about 250° F. In certain embodiments, the surfactant and microparticle are added to a stillage having a temperature of from about 120° F. to about 200° F. In certain embodiments, the surfactant and microparticle are added to a stillage having at a pH of from about 3 to about 6. In certain embodiments, the surfactant and microparticle are added to a stillage having a moisture content of from about 15% to about 90% by weight, based on weight of stillage.

In certain embodiments, the method comprises centrifuging a stillage, surfactant, and microparticle at a temperature of from about 120° F. to 200° F.

In certain embodiments, the surfactant and/or microparticle are at a temperature of from 0° C. to 100° C. when added to a stillage. In certain embodiments, the surfactant and/or microparticle are at a temperature of from 10° C. to 90° C. when added to a stillage. In certain embodiments, the surfactant and/or microparticle are at a temperature of from 15° C. to 85° C. when added to a stillage.

In certain embodiments, the method further comprises separating oil from the stillage using a separation device. In certain preferred embodiments, a centrifuge is used to separate oil from stillage. In certain embodiments, a disk stack or tricanter centrifuge is used to separate oil from stillage.

In certain embodiments, the surfactant and the microparticle are added to a dissolved air floatation ("DAF") float oil extraction process. For example, a flocculant such as an anionic or cationic compound (e.g., polymer) is added to a grain to ethanol process (e.g., thin stillage), and the water is separated from flocculated solids using a dewatering device (e.g., solids/liquids separation device). The method is used to remove suspended solids, fats, oils, and grease from stillage of a grain to ethanol process.

In another embodiment, the invention provides a composition for recovering oil from a grain to ethanol process. The composition comprises ethanol stillage and a microparticle comprising hydrophilic silica.

In certain embodiments, the hydrophilic silica is colloidal silica, precipitated silica, or fumed silica. In certain preferred embodiments, the hydrophilic silica is colloidal silica.

In certain embodiments, the hydrophilic silica has a particle size of from about 0.01 µm to about 200 µm. Thus, in certain embodiments, the hydrophilic has a particle size of from about 0.01 µm to about 200 µm, from about 0.01 µm to about 150 µm, from about 0.01 µm to about 100 µm, from about 0.01 µm to about 75 µm, from about 0.01 µm to about 50 µm, from about 0.01 µm to about 40 µm, from about 0.01 µm to about 30 µm, from about 0.01 µm to about 25 µm, from about 0.01 µm to about 10 µm, from about 1 µm to about 200 µm, from about 1 µm to about 200 µm, from about 10 µm to about 200 µm, or from about 10 µm to about 100 µm. In certain preferred embodiments, the hydrophilic silica has a particle size of from about 0.01 µm to about 50 µm. The particle size may be a $D_{50}$ particle size.

In certain embodiments, the hydrophilic silica has a surface area of from about 50 $m^2/g$ to about 600 $m^2/g$. Thus, in certain embodiments, the hydrophilic silica has a surface area of from about 50 $m^2/g$ to about 600 $m^2/g$, from about 50 $m^2/g$ to about 550 $m^2/g$, from about 50 $m^2/g$ to about 500

$m^2/g$, from about 50 $m^2/g$ to about 450 $m^2/g$, from about 50 $m^2/g$ to about 400 $m^2/g$, from about 50 $m^2/g$ to about 300 $m^2/g$, from about 100 $m^2/g$ to about 600 $m^2/g$, from about 100 $m^2/g$ to about 550 $m^2/g$, from about 100 $m^2/g$ to about 500 $m^2/g$, from about 100 $m^2/g$ to about 450 $m^2/g$, from about 100 $m^2/g$ to about 400 $m^2/g$, or from about 100 $m^2/g$ to about 350 $m^2/g$. In certain embodiments, the hydrophilic silica is fumed silica having a surface area of from about 250 $m^2/g$ to about 350 $m^2/g$. In certain preferred embodiments, the hydrophilic silica is colloidal silica having a surface area of from about 300 $m^2/g$ to about 500 $m^2/g$. The surface area may be a BET (Brunauer, Emmett, Teller) surface area.

In certain embodiments, the hydrophilic silica has a surface area of from about 500 $m^2/g$ to about 1,000 $m^2/g$. Thus, in certain embodiments, the hydrophilic silica has a surface area of from about 500 $m^2/g$ to about 1,000 $m^2/g$, from about 500 $m^2/g$ to about 900 $m^2/g$, from about 500 $m^2/g$ to about 850 $m^2/g$, from about 550 $m^2/g$ to about 1,000 $m^2/g$, from about 600 $m^2/g$ to about 1,000 $m^2/g$, from about 650 $m^2/g$ to about 1,000 $m^2/g$, from about 700 $m^2/g$ to about 1,000 $m^2/g$, from about 750 $m^2/g$ to about 1,000 $m^2/g$, from about 550 $m^2/g$ to about 950 $m^2/g$, from about 600 $m^2/g$ to about 950 $m^2/g$, from about 650 $m^2/g$ to about 950 $m^2/g$, from about 700 $m^2/g$ to about 950 $m^2/g$, from about 750 $m^2/g$ to about 950 $m^2/g$, from about 550 $m^2/g$ to about 900 $m^2/g$, from about 600 $m^2/g$ to about 900 $m^2/g$, from about 650 $m^2/g$ to about 900 $m^2/g$, from about 700 $m^2/g$ to about 900 $m^2/g$, from about 550 $m^2/g$ to about 850 $m^2/g$, from about 600 $m^2/g$ to about 850 $m^2/g$, from about 650 $m^2/g$ to about 850 $m^2/g$, from about 700 $m^2/g$ to about 850 $m^2/g$, from about 750 $m^2/g$ to about 850 $m^2/g$, from about 750 $m^2/g$ to about 800 $m^2/g$, from about 800 $m^2/g$ to about 850 $m^2/g$, 850 $m^2/g$ to about 900 $m^2/g$, or from about 850 $m^2/g$ to about 950 $m^2/g$. In certain embodiments, the hydrophilic silica is colloidal silica having a surface area of from about 750 $m^2/g$ to about 900 $m^2/g$. The surface area may be a BET (Brunauer, Emmett, Teller) surface area.

In certain embodiments, the hydrophilic silica has a surface area of at least about 500 $m^2/g$. Thus, in certain embodiments, the hydrophilic silica has a surface area of at least about 500 $m^2/g$, at least about 550 $m^2/g$, at least about 600 $m^2/g$, at least about 650 $m^2/g$, at least about 700 $m^2/g$, at least about 750 $m^2/g$, at least about 800 $m^2/g$, or at least about 850 $m^2/g$.

The S-value of the colloidal silica is another parameter of colloidal silica. S-value is a quantification of the degree of microaggregation of colloidal materials. The exact definition of S-value can be found in *The Chemistry of Silica: Solubility, Polymerization, Colloid and Surface Properties and Biochemistry of Silica*, by Ralph K. Iler, John Wiley and Sons, Inc. (1979). In certain embodiments, the colloidal silica has an S-value of from about 20% to about 50%. Thus, in certain embodiments, the colloidal silica has an S-value of from about 20% to about 50%, from about 22% to about 50%, from about 24% to about 50%, from about 26% to about 50%, from about 28% to about 50%, from about 30% to about 50%, from about 22% to about 46%, from about 22% to about 42%, from about 22% to about 38%, from about 26% to about 48%, from about 26% to about 46%, from about 26% to about 44%, from about 26% to about 42%, from about 26% to about 40%, from about 26% to about 38%, from about 26% to about 36%, from about 28% to about 40%, from about 29% to about 39%, from about 30% to about 50%, from about 32% to about 50%, or from about 34% to about 50%.

In certain embodiments, the colloidal silica has an S-value of at least about 20%, at least about 22%, at least about 24%, at least about 26%, at least about 28%, at least about 30%, at least about 32%, or at least about 35%.

In certain preferred embodiments, the particle size, specific surface area, viscosity, and S-value disclosed refer to the colloidal silica prior to adding to the ethanol stillage.

In certain embodiments, the composition comprises microparticle in an amount of at least about 50 ppm, at least about 100 ppm, at least about 200 μm, or at least about 300 ppm, based on weight of the composition. In certain embodiments, the composition comprises microparticle in an amount of about 10,000 ppm or less, about 5,000 ppm or less, about 2,500 ppm or less, about 1,500 ppm or less, or about 1,000 ppm or less, based on weight of the composition.

In certain embodiments, the composition comprises microparticle in an amount of from about 0.01 ppm to about 5,000 ppm, based on weight of the composition. Thus, in certain embodiments, the composition comprises microparticle in an amount of from about 0.01 ppm to about 1,000 ppm, from about 0.01 ppm to about 4,000 ppm, from about 0.01 ppm to about 3,000 ppm, from about 0.01 ppm to about 2,000 ppm, from about 0.01 ppm to about 1,000 ppm, from about 0.01 ppm to about 750 ppm, from about 0.01 ppm to about 500 ppm, from about 0.01 ppm to about 400 ppm, from about 0.01 ppm to about 300 ppm, from about 0.01 ppm to about 250 ppm, from about 0.01 ppm to about 200 ppm, from about 0.01 ppm to about 150 ppm, or from about 0.01 ppm to about 100 ppm, based on weight of the composition. In certain preferred embodiments, the composition comprises microparticle an amount of from about 300 ppm to about 1300 ppm, based on weight of the composition. In certain preferred embodiments, the composition comprises microparticle in an amount of from about 500 ppm to about 1,000 ppm, based on weight of the composition. In certain preferred embodiments, the composition comprises microparticle an amount of from about 0.1 ppm to about 1,000 ppm, based on weight of the composition.

In certain embodiments, the composition comprises hydrophilic silica in an amount of from about 0.01 ppm to about 5,000 ppm, based on weight of the composition. Thus, in certain embodiments, the composition comprises hydrophilic silica in an amount of from about 0.01 ppm to about 5,000 ppm, from about 0.01 ppm to about 4,000 ppm, from about 0.01 ppm to about 3,000 ppm, from about 0.01 ppm to about 2,000 ppm, from about 0.01 ppm to about 1,000 ppm, from about 0.01 ppm to about 750 ppm, from about 0.01 ppm to about 500 ppm, from about 0.01 ppm to about 400 ppm, from about 0.01 ppm to about 300 ppm, from about 0.01 ppm to about 250 ppm, from about 0.01 ppm to about 200 ppm, from about 0.01 ppm to about 150 ppm, from about 0.01 ppm to about 100 ppm, from about 0.01 ppm to about 75 ppm, from about 0.01 ppm to about 50 ppm, from about 0.01 ppm to about 40 ppm, from about 0.01 ppm to about 25 ppm, from about 1 ppm to about 1,000 ppm, from about 10 ppm to about 1,000 ppm, from about 1 ppm to about 300 ppm, or from about 1 ppm to about 100 ppm, based on weight of the composition. In certain preferred embodiments, the composition comprises hydrophilic silica in an amount of from about 15 ppm to about 300 ppm, based on weight of the composition. In certain preferred embodiments, the composition comprises hydrophilic silica in an amount of from about 50 ppm to about 200 ppm, based on weight of the composition.

In certain embodiments, the composition comprises hydrophilic silica in an amount of about 10,000 ppm or less, about 5,000 ppm or less, about 2,500 ppm or less, about 1,500 ppm or less, or about 1,000 ppm or less, based on weight of the composition.

In certain embodiments, the composition comprises one or more stillage including stillage, whole stillage, thin stillage, syrup, wet cake, wet grain, dry distiller grain, beer, beer mash, backset, wet grain, and combinations thereof. In certain embodiments, the ethanol stillage is a whole stillage, thin stillage, syrup, or a combination thereof. In certain preferred embodiments, the ethanol stillage is a thick stillage.

In certain embodiments, the microparticle further comprises a siliceous material or polymeric microparticle, as described above.

Example 1

This Example illustrates the amount of oil extracted from thick stillage in the presence of a surfactant and microparticle in accordance with an embodiment of the invention.

Thick stillage was obtained from a dry grind corn to ethanol manufacturing plant ("Plant I"). Samples of the thick stillage were treated with Tween 80 polysorbate surfactant (available as GR8109 from Nalco Company, Naperville, Ill.) alone at various dosages. Samples of the thick stillage were also treated with Tween 80 polysorbate surfactant and hydrophilic colloidal silica microparticle (available as POSITEK N9000 from Nalco Company, Naperville, Ill.) at various dosages. The surfactant and silica microparticle were dosed at a weight ratio of 5.25:1 (surfactant:silica microparticle).

For each sample, the thick stillage was heated to about 189° F., then the surfactant and the microparticle (when applicable) were added at the indicated dosage under mixing. The mixture was mixed for about 10 minutes and then was transferred to a centrifuge tube. The mixture was centrifuged at about 140° F. at about 1800 rpm for about 15 minutes. After centrifugation, the amount of oil was measured.

Figure 2:
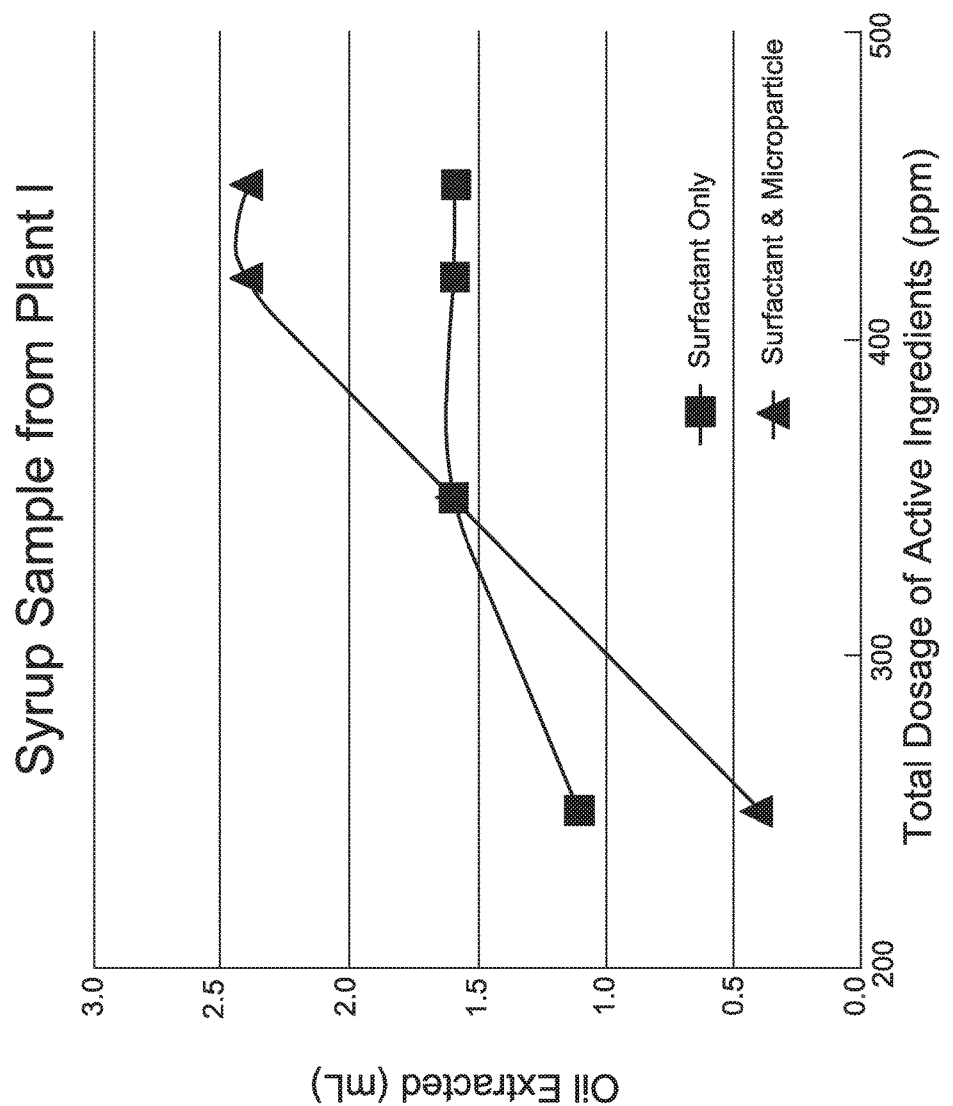
FIG. 2 is a line graph illustrating the amount of oil extracted vs. total dosage of active ingredients (surfactant and microparticle) for a syrup in the presence and absence of a microparticle.

The amount of oil extracted vs. total dosage of active ingredients was plotted as shown in FIG. 2. The total dosage of active ingredient refers to the dosage of surfactant or the dosage of surfactant plus the dosage of silica microparticle. FIG. 2 shows that the use of microparticle increased the amount of oil extracted from the thick stillage at higher surfactant dosage.

Figure 3:
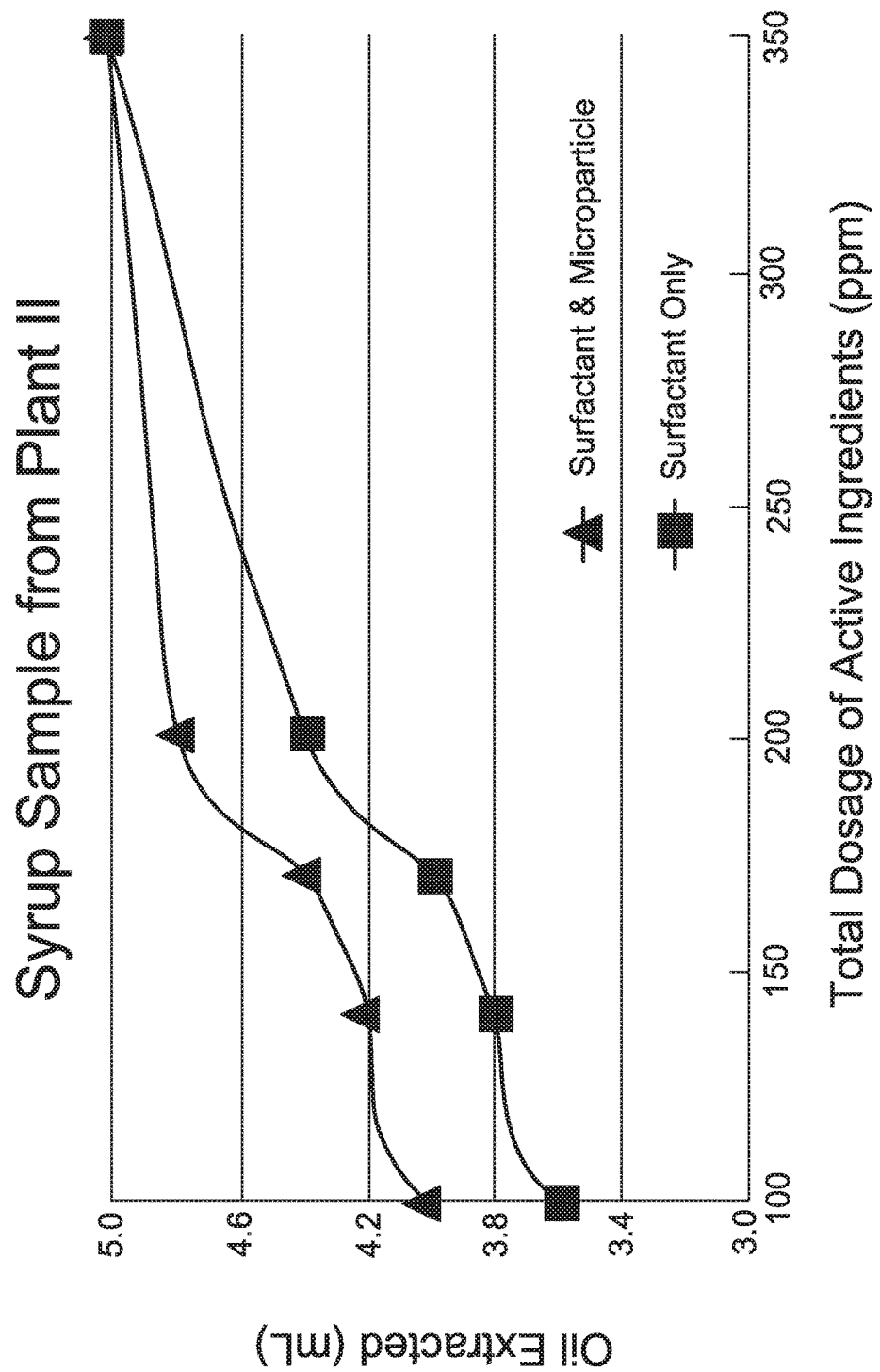
FIG. 3 is a line graph illustrating the amount of oil extracted vs. total dosage of active ingredients (surfactant and microparticle) for a syrup in the presence and absence of a microparticle.

FIG. 3 shows data for an experiment conducted in the same manner as above, except thick stillage was obtained from a different dry grind corn to ethanol manufacturing plant ("Plant II"). The data of FIG. 3 illustrates that the use of silica microparticles increased the amount of oil extracted from a corn syrup.

Figure 4:
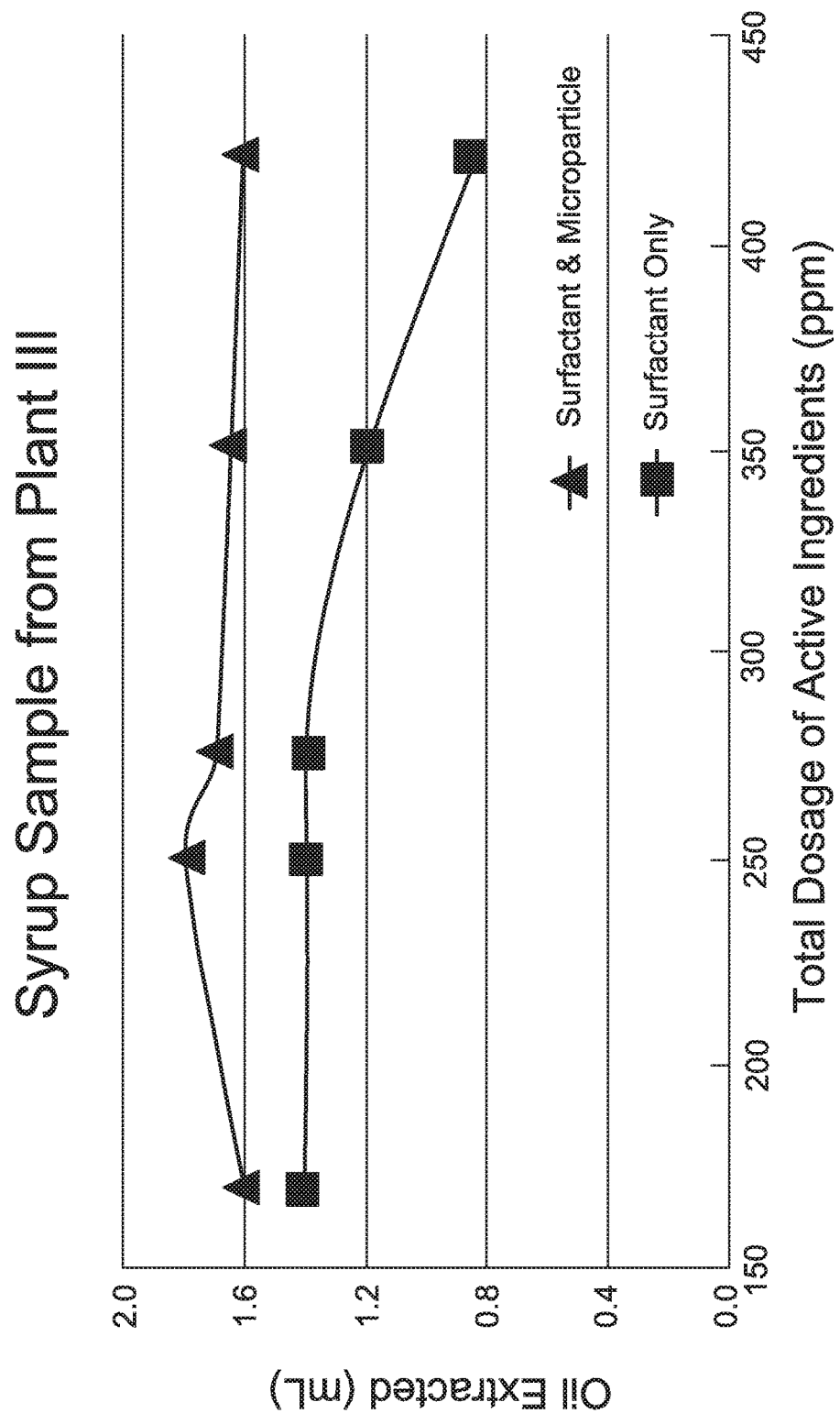
FIG. 4 is a line graph illustrating the amount of oil extracted vs. total dosage of active ingredients (surfactant and microparticle) for a syrup in the presence and absence of a microparticle.

FIG. 4 shows data for an experiment conducted in the same manner as above, except thick stillage was obtained from a different dry grind corn to ethanol manufacturing plant ("Plant III"). The data of FIG. 4 show that silica microparticles increased the amount of oil extracted from a corn syrup. Furthermore, the amount of oil extracted from corn syrup remained relatively constant over a range of dosages when a silica microparticle was used, but decreased as the dosage of surfactant alone increased. Thus, silica microparticle was particularly useful for increasing oil extraction at higher surfactant dosages (e.g., from about 275 ppm to about 425 ppm).

Example 2

This Example illustrates the amount of oil extracted from thick stillage in the presence of a surfactant and microparticle for various stillage samples in accordance with an embodiment of the invention.

A variety of thick stillage samples were obtained from a dry grind corn to ethanol manufacturing plant. Syrup sample I had a solids content of 17% by weight and was obtained from an Illinois corn crop greater than six months old. Syrup sample II had a solids content of 17% by weight and was obtained from an Illinois corn crop less than six months old. Syrup sample III had a solids content of 31% by weight and was obtained from an Illinois corn crop less than six months old. Syrup sample IV had a solids content of 28% by weight and was obtained from a Nebraska corn crop less than six months old. Syrup sample V had a solids content of 30% by weight and was obtained from a South Dakota corn crop less than six months old. The samples were treated with both Tween 80 and colloidal silica, as well as Tween 80 alone. The polysorbate surfactant and silica microparticle were used at a weight ratio of 5.25:1 (surfactant:silica microparticle). Oil extraction for each sample was performed in the same manner as described in Example 1.

Figure 5:
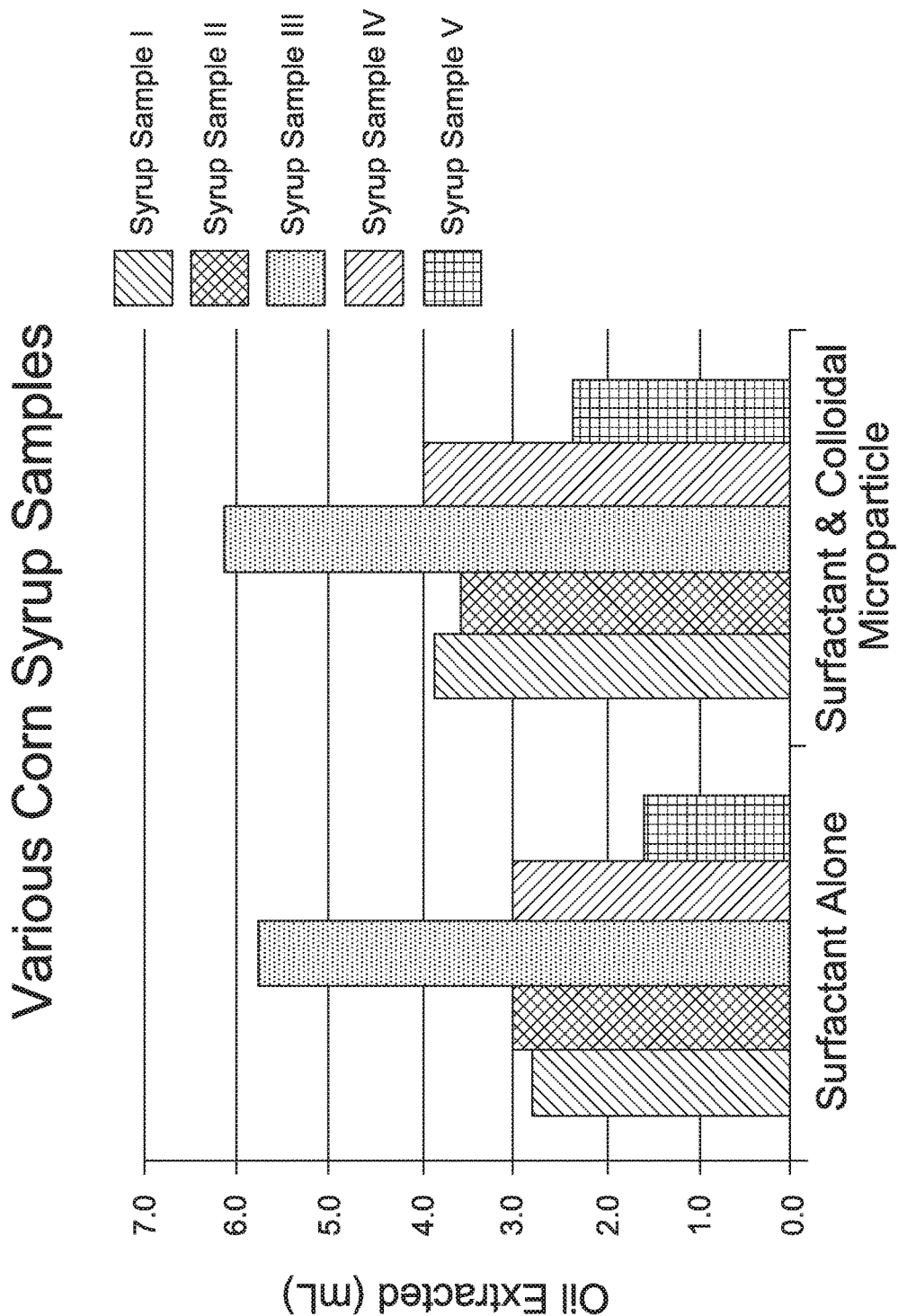
FIG. 5 is a bar graph illustrating the amount of oil extracted from various corn syrup samples using surfactant and colloidal silica.

The amount of oil extracted from each sample is shown in FIG. 5. The data demonstrates that samples treated with hydrophilic colloidal silica consistently produced greater amounts of oil from the thick stillage than samples treated with surfactant alone.

Example 3

This Example illustrates the amount of oil extracted from thick stillage in the presence of a surfactant and various microparticles in accordance with an embodiment of the invention.

Thick stillage samples were obtained from a dry grind corn to ethanol manufacturing plant. The samples were treated with Tween 80 surfactant and colloidal, precipitated, or fumed silica (available from Evonik). The polysorbate surfactant and silica microparticle were used at a weight ratio of 5.25:1 (surfactant:silica microparticle). Oil extraction for each sample was performed in the same manner as described in Example 1.

Figure 6:
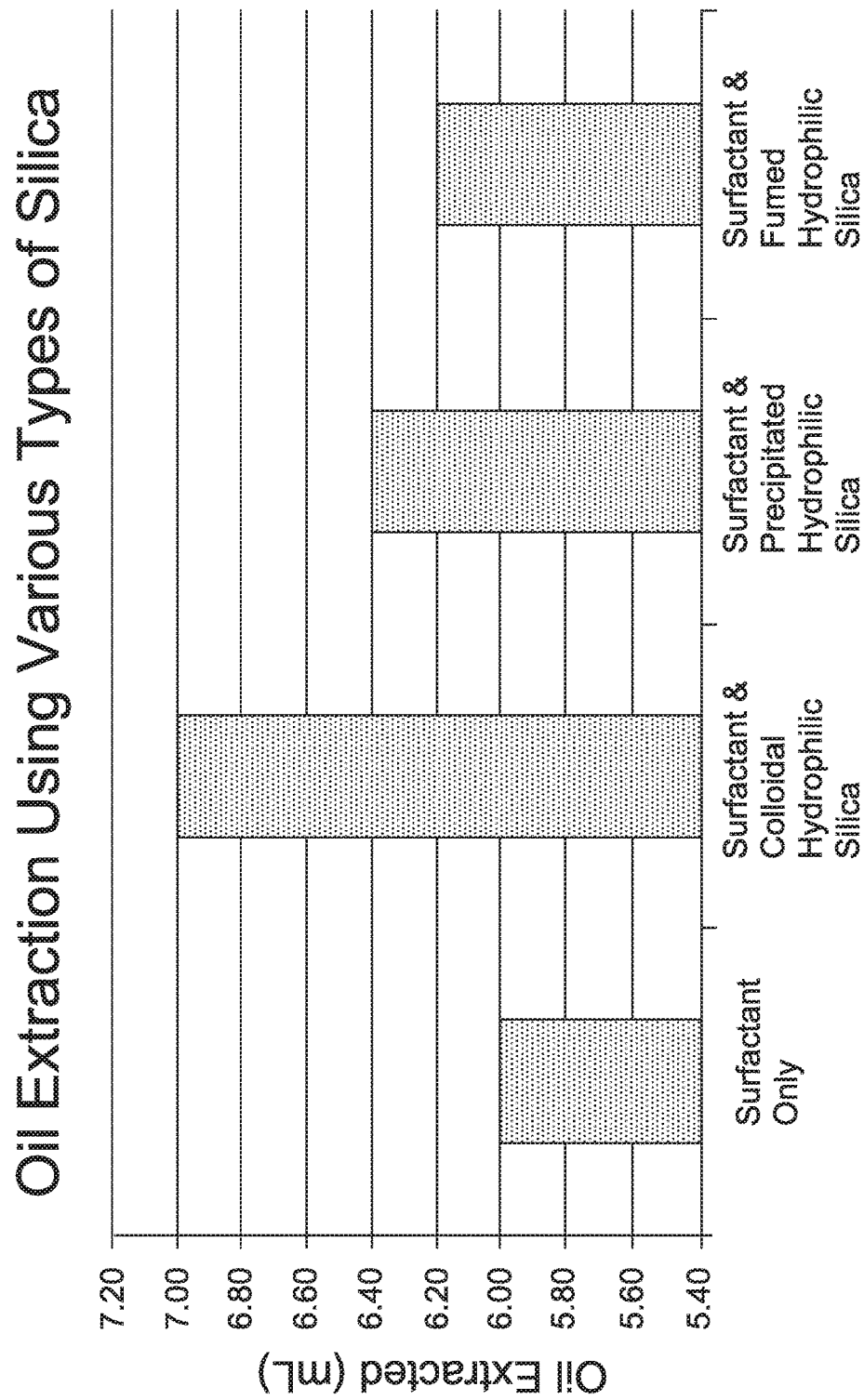
FIG. 6 is a bar graph illustrating the amount of oil extracted from corn syrup using hydrophilic colloidal, precipitated, and fumed silica.

The amount of oil extracted from each sample is shown in FIG. 6. The data demonstrates that the use of colloidal, fumed, and precipitated silica and surfactant produced greater amounts of oil from the thick stillage than surfactant alone. Furthermore, the data shows that colloidal silica is particularly effective at increasing oil extraction.

Example 4

This Example illustrates the amount of oil extracted from thick stillage in the presence of different ratios of silica microparticle and surfactant in accordance with an embodiment of the invention.

A thick stillage was obtained from a dry grind corn to ethanol manufacturing plant. Samples of the thick stillage were treated with Tween 80 alone. Samples of the thick stillage were also treated with Tween 80 surfactant and hydrophilic colloidal silica microparticle. The polysorbate surfactant and silica microparticle were analyzed at various weight ratios. Oil extraction for each sample was performed in the same manner as described in Example 1.

Figure 7:
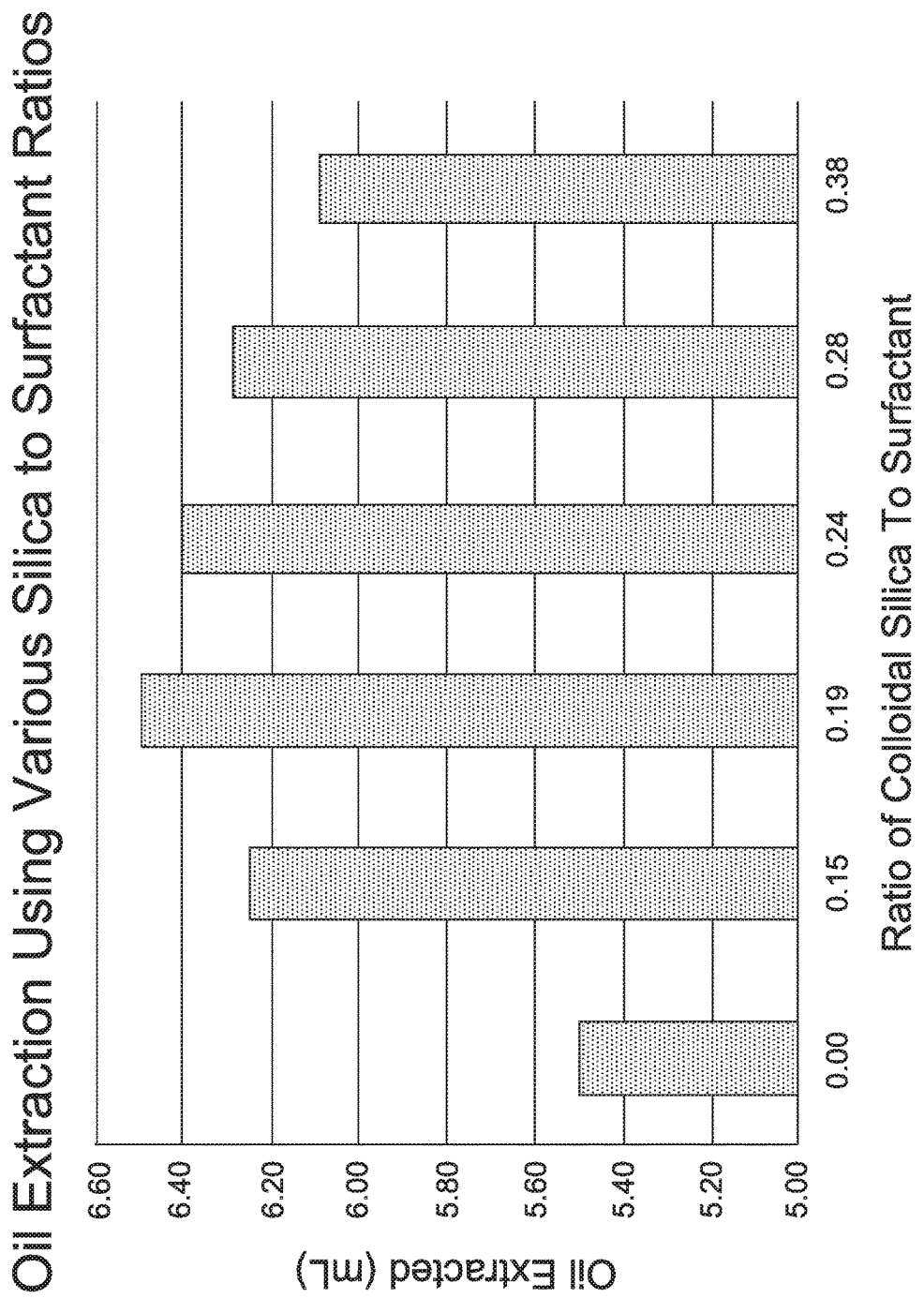
FIG. 7 is a bar graph illustrating the effect of the ratio of surfactant to colloidal silica on the amount of oil extracted from a syrup.

The amount of oil extracted from each sample is shown in FIG. 7, where the ratio of silica to surfactant is located on the x-axis and oil extracted is located on the y-axis. The data demonstrates that use of colloidal silica and surfactant produced greater amounts of oil from the thick stillage than to use of surfactant alone. Furthermore, the data shows that the amount of oil extracted from the thick stillage is dependent upon the ratio of silica microparticle to surfactant.

Example 5

This Example illustrates the amount of oil extracted in a thin stillage DAF float oil extraction process in accordance with an embodiment of the invention.

Thin stillage was obtained from a dry grind corn to ethanol manufacturing plant. An anionic flocculant was added to the thin stillage, and the stillage was sent to a DAF separation device to separate flocculated solids from the liquid of the stillage. The resulting DAF float on top of the liquid was separated and treated with Tween 80 surfactant and colloidal silica microparticle. Oil extraction was performed in the same manner as described in Example 1.

Figure 8:
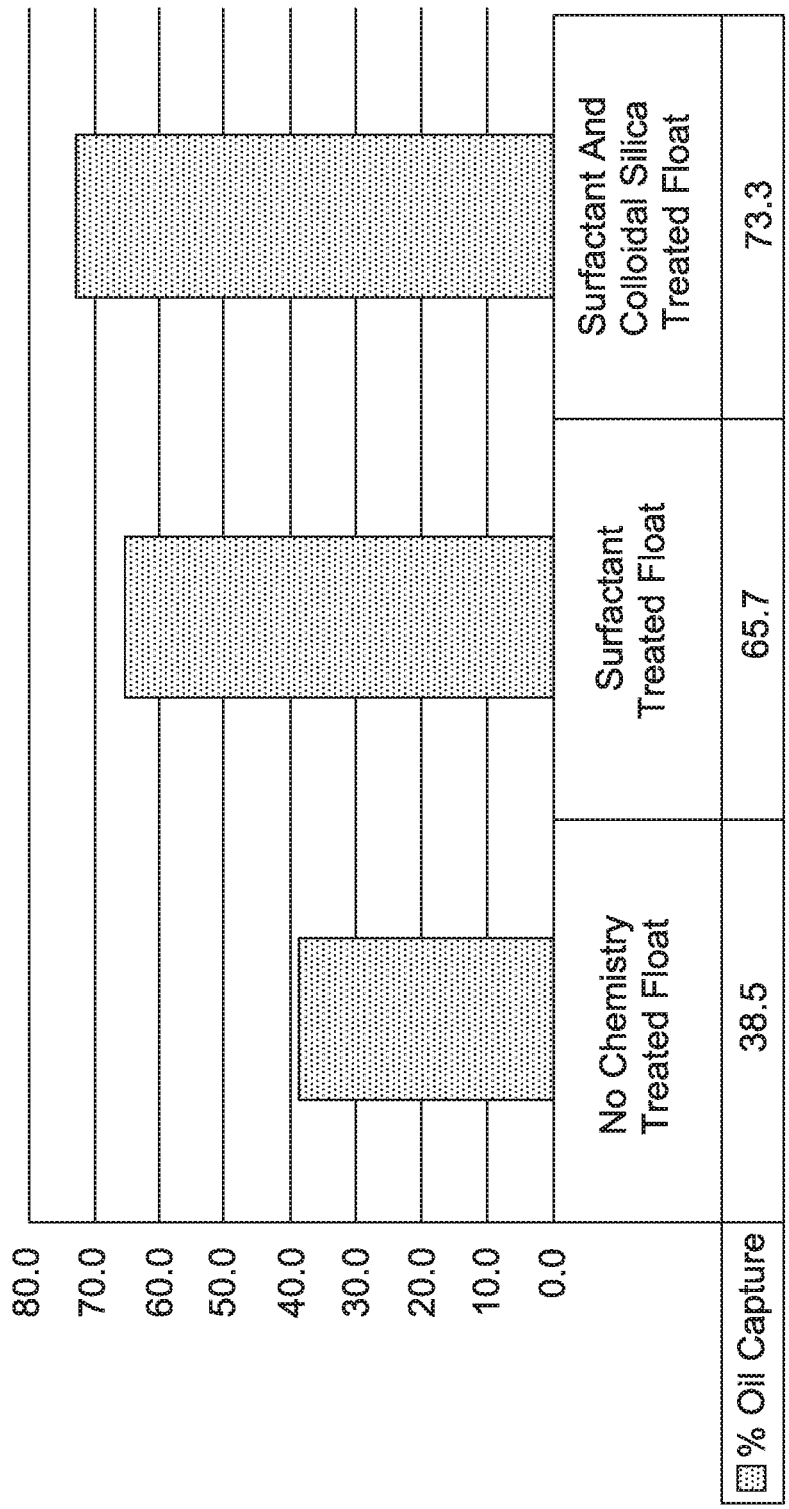
FIG. 8 is a bar graph illustrating the amount of oil extracted from a thin stillage dissolved air floatation ("DAF") float oil extraction process.

The amount of oil extracted from each sample is shown in FIG. 8. The data demonstrates that use of colloidal silica and surfactant increased the amount of oil extracted in the DAF float oil extraction process.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of treating a grain to ethanol process stream comprising stillage and a surfactant, the method comprising adding hydrophilic colloidal silica to the grain to ethanol process stream comprising the stillage and the surfactant to form a treated process stream.

2. The method of claim 1, wherein the stillage is thick stillage.

3. The method of claim 1, wherein the stillage is thin stillage.

4. The method of claim 1, wherein the hydrophilic colloidal silica has a particle size of from about 0.01 to about 500 nm.

5. The method of claim 1, wherein the surfactant is an alkoxylated sorbitan alkylate.

6. The method of claim 1, wherein the surfactant is a polysorbate.

7. The method of claim 1, wherein the surfactant and hydrophilic colloidal silica are present in the treated process stream at a weight ratio of from about 15 to 1 to about 2 to 1.

8. The method of claim 1, wherein the surfactant and hydrophilic colloidal silica are present in the treated process stream at a weight ratio of from about 10 to 1 to about 1 to 1.

9. The method of claim 1, wherein the hydrophilic colloidal silica has an S-value of from about 24% to about 40%.

10. The method of claim 1, further comprising separating oil from the treated process stream.

11. The method of claim 1, wherein the grain to ethanol process stream is dissolved air floatation ("DAF") process stream.

12. The method of claim 1, wherein the hydrophilic colloidal silica has a specific surface area of from about 700 $m^2/g$ to about 850 $m^2/g$.

13. The method of claim 1, wherein the stillage is whole stillage.

14. The method of claim 1, further comprising feeding the treated process stream to a dissolved air flotation ("DAF") separation device to form a dissolved air flotation ("DAF") float and a dissolved air flotation ("DAF") process stream.

15. The method of claim 1, wherein the hydrophilic colloidal silica is an aqueous suspension.

16. The method of claim 15, wherein the aqueous suspension has a solids content of from about 16% to about 18% by weight based on weight of $SiO_2$ solids.

17. The method of claim 15, wherein the aqueous suspension has a viscosity of from about 4 cps to about 20 cps.

18. The method of claim 1, wherein the hydrophilic colloidal silica is present in the treated process stream at from about 0.01 ppm to about 5,000 ppm based on weight of the stillage.

19. The method of claim 14, wherein the dissolved air flotation ("DAF") process stream further comprises a flocculant.

* * * * *